(12) United States Patent
Devine et al.

(10) Patent No.: US 7,160,980 B2
(45) Date of Patent: Jan. 9, 2007

(54) POLYKETONES

(75) Inventors: John Neil Devine, Lancashire (GB); Stuart Green, Lancashire (GB); David John Kemmish, Lancashire (GB); Brian Wilson, Lancashire (GB)

(73) Assignee: Victrex Manufacturing Limited, Thornton Clevelays (GB)

( * ) Notice: Subject to any disclaimer, the term of this patent is extended or adjusted under 35 U.S.C. 154(b) by 0 days.

(21) Appl. No.: 10/478,997

(22) PCT Filed: May 29, 2002

(86) PCT No.: PCT/GB02/02525

§ 371 (c)(1),
(2), (4) Date: Aug. 17, 2004

(87) PCT Pub. No.: WO02/096974

PCT Pub. Date: Dec. 5, 2002

(65) Prior Publication Data

US 2005/0004340 A1    Jan. 6, 2005

(30) Foreign Application Priority Data

May 30, 2001    (GB)    ................... 0113053.3

(51) Int. Cl.
C08F 6/00    (2006.01)
(52) U.S. Cl. ............... 528/499; 528/220; 528/480; 528/481; 528/494
(58) Field of Classification Search ............ 528/220, 528/480, 481, 494, 499
See application file for complete search history.

(56) References Cited

U.S. PATENT DOCUMENTS

| | | | |
|---|---|---|---|
| 4,102,875 A | 7/1978 | Campbell | |
| 4,105,636 A | 8/1978 | Taylor | |
| 4,320,224 A | 3/1982 | Rose et al. | |
| 4,421,874 A | 12/1983 | Seefluth | |
| 4,507,468 A | 3/1985 | Kawabata et al. | |
| 5,194,517 A | 3/1993 | Blubaugh et al. | |
| 5,440,009 A * | 8/1995 | Ash et al. | ............ 528/388 |
| 5,475,079 A | 12/1995 | Okano et al. | |
| 6,291,707 B1 * | 9/2001 | Lin | ............ 562/485 |
| 6,544,473 B1 * | 4/2003 | Shintaku et al. | ............ 422/26 |

FOREIGN PATENT DOCUMENTS

| | | |
|---|---|---|
| CN | 1176970 | 3/1998 |
| CN | 1176970 A | 3/1998 |
| DE | 195 45 968 A | 6/1997 |
| DE | 195 45 968 A1 | 6/1997 |
| EP | 0 146 811 A2 | 7/1985 |
| EP | 0 255 230 A1 | 2/1988 |
| EP | 0255230 A1 | 2/1988 |
| EP | 0 265 524 A1 | 5/1988 |
| EP | 0265524 A1 | 5/1988 |
| EP | 0 292 211 A | 11/1988 |
| EP | 0 292 211 A2 | 11/1988 |
| EP | 0 292 211 A3 | 11/1988 |
| EP | 0292211 A2 | 11/1988 |
| EP | 0 351 168 A2 | 1/1990 |
| EP | 0 577 849 A1 | 1/1994 |
| JP | 0 121 124 A | 5/1991 |

OTHER PUBLICATIONS

Colquhoun, Howard M., et al; "Synthesis of Aromatic Polyetherketones in Trifluoromethanesulphonic Acid"; *Polymer*, vol. 29, No. 10, pp. 1902-1908, (1988), XP000986259.

* cited by examiner

*Primary Examiner*—Terressa Boykin
(74) *Attorney, Agent, or Firm*—Nixon & Vanderhye

(57) ABSTRACT

Method of purifying a polymeric material of a type which includes (A) phenyl moieties; (B) carbonyl and/or sulphone moieties; and; (C) ether and/or thioether moieties. The method includes contacting the polymeric material with a solvent formulation which is at a temperature of greater than 100° C. and a pressure above ambient pressure thereby to charge the solvent formulation with impurities derived from the polymeric material, and separating the charged solvent from the polymeric material.

45 Claims, 1 Drawing Sheet

POLYKETONES

This application is the U.S. national phase of international application PCT/GB02/02525, filed in English on 29 May 2002, which designated the US. PCT/GB02/102525 claims priority to GB Application No. 0113053.3 30 May 2001. The entire contents of these applications are incorporated herein by reference.

This invention relates to polyketones and particularly, although not exclusively, relates to the preparation of polyketones, for example polyetheretherketone, of high purity.

BACKGROUND OF THE INVENTION

The thermoplastic aromatic polyketone polyetheretherketone has been known for over twenty years. EP 0 001 879 (Imperial Chemical Industries) describes its preparation and use. For example, it may be prepared by reaction of 4,4'-difluorobenzophenone and hydroquinone in diphenylsulphone and in the presence of an alkali metal carbonate, for example potassium carbonate and/or sodium carbonate. After the reaction, the diphenylsulphone and inorganic salts are removed by washing successively with acetone (twice), water (twice), and acetone/methanol (twice).

EP 0 292 211 (Imperial Chemical Industries) describes a washing process for removing inorganic salt from an aryl polyether or aryl polythioether phase containing the inorganic salt, wherein the aryl polyether or aryl polythioether phase is initially in the form of a "toffee" and is caused to assume a liquid form by melting and/or dissolution in a solvent, for example diphenyl sulphone. The liquid mixture is contacted with water to dissolve salt out of the mixture.

Polyetheretherketone has been commercially available for many years, initially from Imperial Chemical Industries (the applicant for the abovementioned patent application) and subsequently from Victrex Plc, the assignee of Imperial Chemical Industries. However, notwithstanding attempts to remove inorganic salts from polyetheretherketone in the processes described, commercially available grades of polyetheretherketone (e.g. Victrex standard grade PEEK™ 450 P) tend to have greater than 250 ppm of alkali metal cations, for example $Na^+$, in them.

SUMMARY OF THE INVENTION

It is an object of the present invention to address problems associated with the purity of polyketones, for example polyetheretherketone.

According to a first aspect of the invention, there is provided a method of purifying a polymeric material of a type which includes:

(A) phenyl moieties;
(B) carbonyl and/or sulphone moieties; and
(C) ether and/or thioether moieties the method including contacting the polymeric material with a solvent formulation which is at a temperature of greater than 100° C. and a pressure above ambient pressure thereby to charge the solvent formulation with impurities derived from said polymeric material, and separating the charged solvent from the polymeric material.

Except where otherwise stated throughout this specification, any alkyl, akenyl or alkynyl moiety suitably has up to 8, preferably up to 6, more preferably up to 4, especially up to 2, carbon atoms and may be of straight chain or, where possible, of branched chain structure. Generally, methyl and ethyl are preferred alkyl groups and $C_2$ alkenyl and alkynyl groups are preferred.

Except where otherwise stated in this specification, optional substituents of an alkyl group may include halogen atoms, for example fluorine, chlorine, bromine and iodine atoms, and nitro, cyano, alkoxy, hydroxy, amino, alkylamino, sulphinyl, alkylsulphinyl, sulphonyl, alkylsulphonyl, amido, alkylamido, alkoxycarbonyl, haloalkoxycarbonyl and haloalkyl groups. Preferably, optionally substituted alkyl groups are unsubstituted.

Preferably, said polymeric material has a moiety of formula

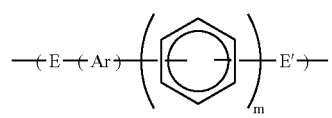

and/or a moiety of formula

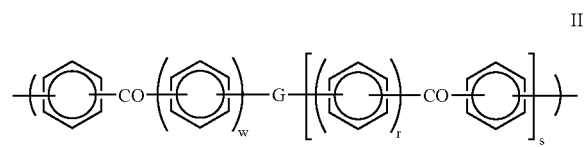

and/or a moiety of formula

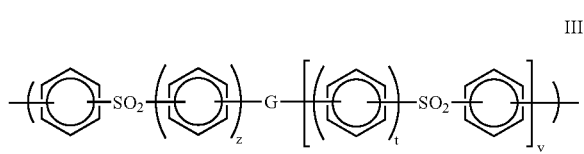

wherein the phenyl moieties in units I, II, and III are independently optionally substituted and optionally crosslinked; and wherein m, r, s, t, v, w and z independently represent zero or a positive integer, E and E' independently represent an oxygen or a sulphur atom or a direct link, G represents an oxygen or sulphur atom, a direct link or a —O—Ph—O— moiety where Ph represents a phenyl group and Ar is selected from one of the following moieties (i)*, (i)**, (i) to (x) which is bonded via one or more of its phenyl moieties to adjacent moieties

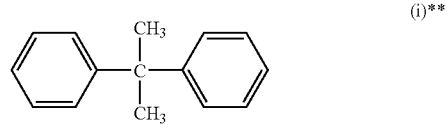

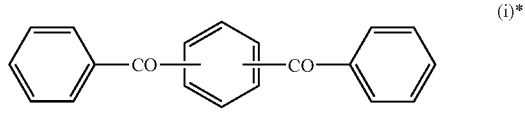

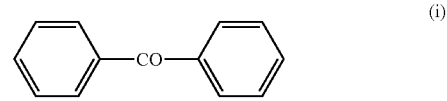

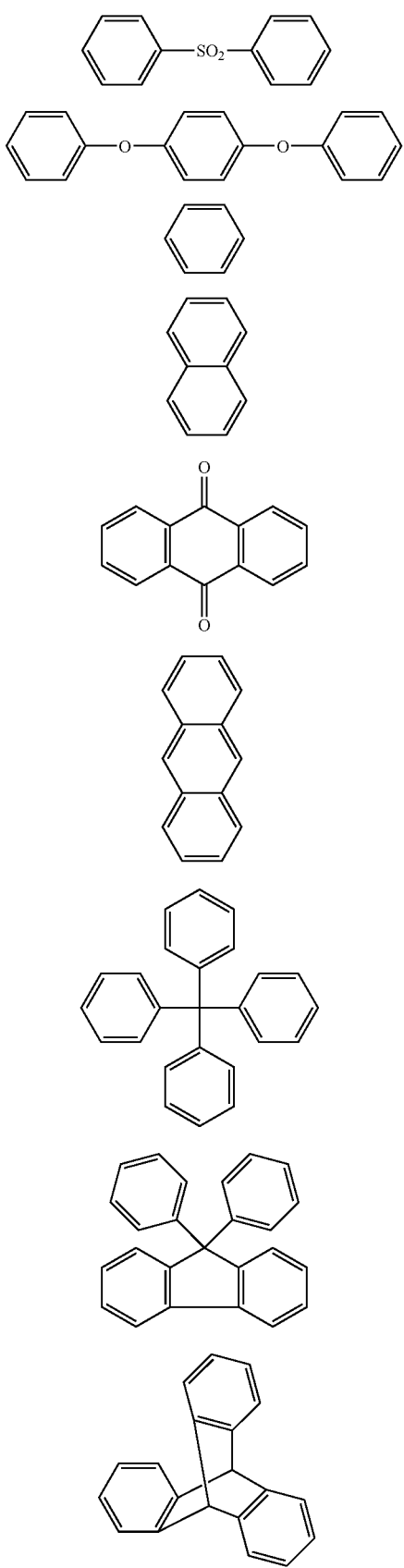

Unless otherwise stated in this specification, a phenyl moiety may have 1,4- or 1,3-, especially 1,4-, linkages to moieties to which it is bonded.

In (i)*, the middle phenyl may be 1,4- or 1,3-substituted.

Said polymeric material may include more than one different type of repeat unit of formula I; more than one different type of repeat unit of formula II; and more than one different type of repeat unit of formula III. Preferably, however, only one type of repeat unit of formula I, II and/or III is provided.

Said moieties I, II and III are suitably repeat units. In the polymeric material, units I, II and/or III are suitably bonded to one another—that is, with no other atoms or groups being bonded between units I, II, and III.

Where the phenyl moieties in units I, II or III are optionally substituted, they may be optionally substituted by one or more halogen, especially fluorine and chlorine, atoms or alkyl, cycloalkyl or phenyl groups. Preferred alkyl groups are $C_{1-10}$, especially $C_{1-4}$, alkyl groups. Preferred cycloalkyl groups include cyclohexyl and multicyclic groups, for example adamantyl.

Another group of optional substituents of the phenyl moieties in units I, II or III include alkyls, halogens, $C_yF_{2y+1}$ where y is an integer greater than zero, O—$R^q$ (where $R^q$ is selected from the group consisting of alkyls, perfluoralkyls and aryls), $CF=CF_2$, CN, $NO_2$ and OH. Trifluormethylated phenyl moieties may be preferred in some circumstances.

Preferably, said phenyl moieties are not optionally-substituted as described.

Where said polymeric material is cross-linked, it is suitably cross-linked so as to improve its properties. Any suitable means may be used to effect cross-linking. For example, where E represents a sulphur atom, cross-linking between polymer chains may be effected via sulphur atoms on respective chains. Preferably, said polymeric material is not optionally cross-linked as described.

Where w and/or z is/are greater than zero, the respective phenylene moieties may independently have 1,4- or 1,3-linkages to the other moieties in the repeat units of formulae II and/or III. Preferably, said phenylene moieties have 1,4-linkages.

Preferably, the polymeric chain of the polymeric material does not include a —S— moiety. Preferably, G represents a direct link.

Suitably, "a" represents the mole % of units of formula I in said polymeric material, suitably wherein each unit I is the same; "b" represents the mole % of units of formula II in said polymeric material, suitably wherein each unit II is the same; and "c" represents the mole % of units of formula III in said polymeric material, suitably wherein each unit III is the same. Preferably, a is in the range 45–100, more preferably in the range 45–55, especially in the range 48–52. Preferably, the sum of b and c is in the range 0–55, more preferably in the range 45–55, especially in the range 48–52. Preferably, the ratio of a to the sum of b and c is in the range 0.9 to 1.1 and, more preferably, is about 1. Suitably, the sum of a, b and c is at least 90, preferably at least 95, more preferably at least 99, especially about 100. Preferably, said polymeric material consists essentially of moieties I, II and/or III.

Said polymeric material may be a homopolymer having a repeat unit of general formula

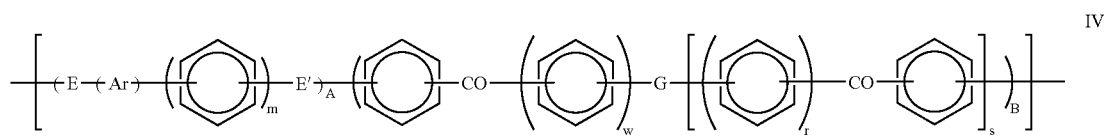

IV or a homopolymer having a repeat unit of general formula

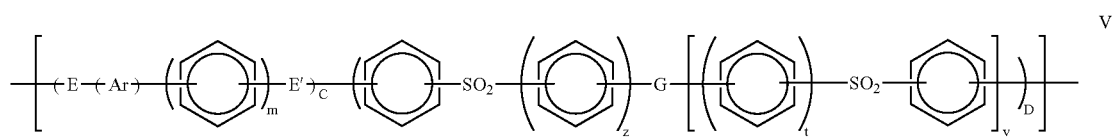

V or a random or block copolymer of at least two different units of IV and/or V
wherein A, B, C and D independently represent 0 or 1 and E, E', G, Ar, m, r, s, t, v, w and z are as described in any statement herein.

As an alternative to a polymeric material comprising units IV and/or V discussed above, said polymeric material may be a homopolymer having a repeat unit of general formula

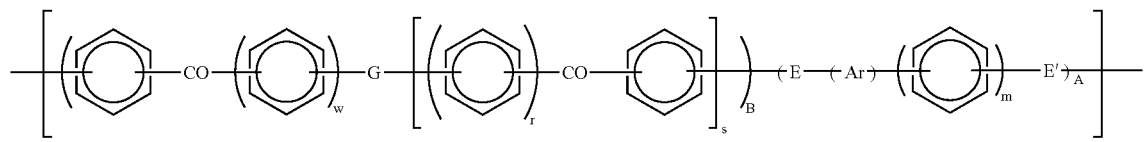

or a homopolymer having a repeat unit of general formula

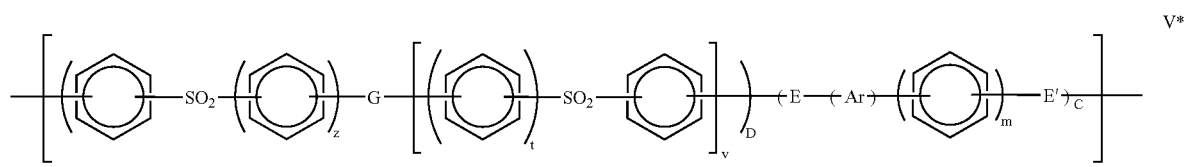

V* or a random or block copolymer of at least two different units of IV* and/or V*, wherein A, B, C, and D independently represent 0 or 1 and E, E', G, Ar, m, r, s, t, v, w and z are as described in any statement herein.

Preferably, m is in the range 0–3, more preferably 0–2, especially 0–1. Preferably, r is in the range 0–3, more preferably 0–2, especially 0–1. Preferably t is in the range 0–3, more preferably 0–2, especially 0–1. Preferably, s is 0 or 1. Preferably v is 0 or 1. Preferably, w is 0 or 1. Preferably z is 0 or 1.

Preferably, said polymeric material is a homopolymer having a repeat unit of general formula IV.

Preferably Ar is selected from the following moieties (xi)*, (xi)**,(xi) to (xxi):

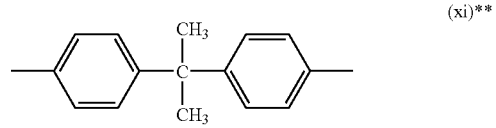

(xi)**

-continued

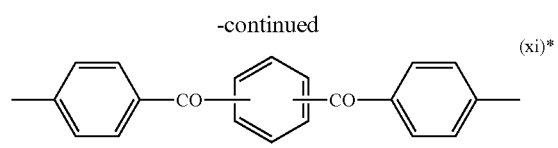

(xi)*

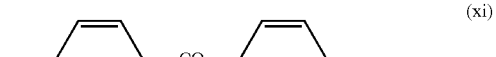

(xi)

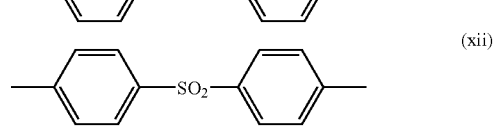

(xii)

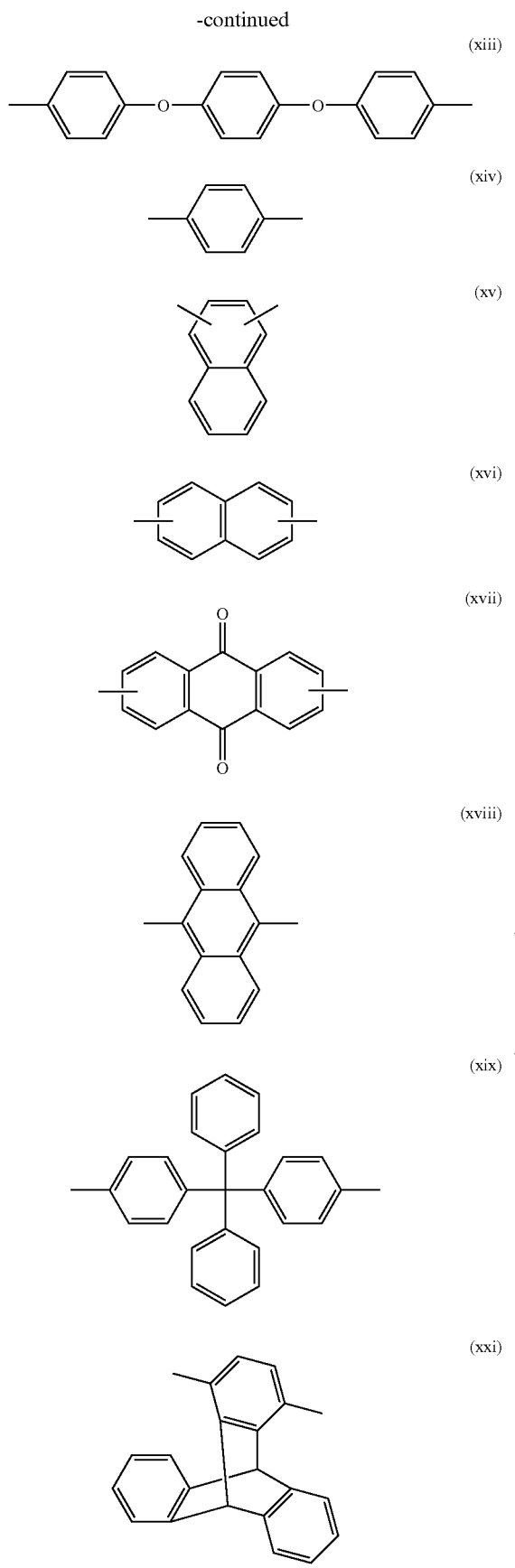

In (xi)*, the middle phenyl may be 1,4- or 1,3-substituted.

Preferably, (xv) is selected from a 1,2-, 1,3-, or a 1,5-moiety; (xvi) is selected from a 1,6-, 2,3-, 2,6- or a 2,7-moiety; and (xvii) is selected from a 1,2-, 1,4-, 1,5-, 1,8- or a 2,6-moiety.

One preferred class of polymeric material does not include any moieties of formula III, but suitably only includes moieties of formulae I and/or II. Where said polymeric material is a homopolymer or random or block copolymer as described, said homopolymer or copolymer suitably includes a repeat unit of general formula IV. Such a polymeric material may, in some embodiments, not include any repeat unit of general formula V.

Suitable moieties Ar are moieties (i)*, (i), (ii), (iii) and (iv) and, of these, moieties (i)*, (i) and (iv) are preferred. Other preferred moieties Ar are moieties (xi)*, (xii), (xi), (xiii) and (xiv) and, of these, moieties (xi)*, (xi) and (xiv) are especially preferred.

An especially preferred class of polymeric material are polymers (or copolymers) which consist essentially of phenyl moieties in conjunction with ketone and/or ether moieties. That is, in the preferred class, the polymeric material does not include repeat units which include —S—, —SO$_2$— or aromatic groups other than phenyl. Preferred polymeric materials of the type described include:

(a) a polymer consisting essentially of units of formula IV wherein Ar represents moiety (iv), E and E' represent oxygen atoms, m represents 0, w represents 1, G represents a direct link, s represents 0, and A and B represent 1 (i.e. polyetheretherketone).

(b) a polymer consisting essentially of units of formula IV wherein E represents an oxygen atom, E' represents a direct link, Ar represents a moiety of structure (i), m represents 0, A represents 1, B represents 0 (i.e. polyetherketone);

(c) a polymer consisting essentially of units of formula IV wherein E represents an oxygen atom, Ar represents moiety (i)*, m represents 0, E' represents a direct link, A represents 1, B represents 0, (i.e. polyetherketoneketone).

(d) a polymer consisting essentially of units of formula IV wherein Ar represents moiety (i), E and E' represent oxygen atoms, G represents a direct link, m represents 0, w represents 1, r represents 0, s represents 1 and A and B represent 1. (i.e. polyetherketoneetherketoneketone).

(e) a polymer consisting essentially of units of formula IV, wherein Ar represents moiety (iv), E and E' represents oxygen atoms, G represents a direct link, m represents 0, w represents 0, s, r, A and B represent 1 (i.e. polyetheretherketoneketone).

Said polymeric material is preferably semi-crystalline. The level and extent of crystallinity in a polymer is preferably measured by wide angle X-ray diffraction (also referred to as Wide Angle X-ray Scattering or WAXS), for example as described by Blundell and Osborn (Polymer 24, 953, 1983). Alternatively, crystallinity may be assessed by Differential Scanning Calerimetry (DSC).

The level of crystallinity in said polymeric material may be at least 1%, suitably at least 3%, preferably at least 5% and more preferably at least 10%. In especially preferred embodiments, the crystallinity may be greater than 30%, more preferably 40%, especially 45%.

The glass transition temperature ($T_g$) of said polymeric material may be at least 144° C., suitably at least 150° C., preferably at least 154° C., more preferably at least 160° C., especially at least 164° C. In some cases, the Tg may be at least 170° C., or at least 190° C. or greater than 250° C. or even 300° C.

Said polymeric material may have an inherent viscosity (IV) of at least 0.1, suitably at least 0.3, preferably at least 0.4, more preferably at least 0.6, especially at least 0.7 (which corresponds to a reduced viscosity (RV) of least 0.8) wherein RV is measured at 25° C. on a solution of the polymer in concentrated sulphuric acid of density 1.84 gcm$^{-3}$, said solution containing 1 g of polymer per 100 cm$^{-3}$ of solution. IV is measured at 25° C. on a solution of polymer in concentrated sulphuric acid of density 1.84 gcm$^3$, said solution containing 0.1 g of polymer per 100 cm$^3$ of solution.

The measurements of both RV and IV both suitably employ a viscometer having a solvent flow time of approximately 2 minutes.

The main peak of the melting endotherm (Tm) for said polymeric material (if crystalline) may be at least 300° C.

In preferred embodiments, said polymeric material is selected from polyetheretherketone and polyetherketone. In an especially preferred embodiment, said polymeric material is polyetheretherketone.

Said solvent formulation preferably includes a first solvent component. Said first solvent component is preferably not an organic solvent. Said first solvent component is preferably capable of forming hydrogen bonds. Said first solvent component preferably includes hydrogen atoms. Said first solvent component suitably has a boiling point at atmospheric pressure of at least 25° C., preferably at least 50° C., more preferably at least 75° C., especially at least 95° C. The boiling point of the first solvent component at atmospheric pressure may be less than 200° C., preferably less than 150° C., more preferably less than 125° C., especially less than 105° C. Said first solvent component is preferably water.

Said solvent formulation suitably has a boiling point at atmospheric pressure of at least 25° C., preferably at least 50° C., more preferably at least 75° C., especially at least 95° C. The boiling point of the solvent formulation at atmospheric pressure may be less than 200° C., preferably less than 150° C., more preferably less than 125° C., especially less than 105° C.

Said solvent formulation preferably includes a major amount of said first solvent component.

In the context-of the present specification a "major amount" means that at least 60 wt %, suitably at least 75 wt %, preferably at least 90 wt %, more preferably at least 95 wt %, especially at least 99 wt % of the referenced component is present.

Preferably, said solvent formulation consists essentially of said first solvent component. Thus, in the method, preferably said polymeric material is contacted with substantially pure water.

In the method, said solvent formulation may be at a temperature of greater than 150° C., suitably greater than 200° C., preferably greater than 250° C., more preferably greater than 275° C., especially greater than 300° C. when contacted with said polymeric material. Said solvent formulation may be at a temperature of less than 500° C., suitably less than 450° C., preferably less than 400° C., more preferably less than 350° C. when contacted with said polymeric material.

The solvent formulation may be at a temperature at or above its critical temperature when contacted with said polymeric material. Preferably, said solvent formulation is below its critical temperature when contacted with said polymeric material. Preferably, said first solvent component is below its critical temperature when contacted with said polymeric material. Thus, in preferred embodiments, said solvent formulation and/or said first solvent component is/are liquid(s) when contacted with said polymeric material.

The solvent formulation may be under a pressure of at least 10 bar, suitably at least 50 bar, preferably at least 100 bar, more preferably at least 130 bar, especially at least 160 bar, when contacted with said polymeric material. In some cases, the pressure may be 190 bar or greater. The pressure may be less than 300 bar, preferably less than 260 bar, more preferably less than 230 bar, especially less than 210 bar. The pressure is preferably selected to maintain the solvent formulation and/or said first solvent component in the liquid state when in contact with said polymeric material.

The difference between the melting point of the polymeric material and the temperature of the solvent formulation when contacted with said polymeric material may be less than 100° C., suitably less than 80° C., preferably less than 60° C., more preferably less than 40° C., especially less than 30° C. Said difference is preferably greater than 10° C., more preferably greater than 15° C., especially greater than 20° C. It may be preferred to maintain a difference in temperature as described since if the difference is too small, the polymeric material may swell too much and restrict the flow of the solvent formulation.

Said charged solvent is preferably separated from the polymeric material by being caused to flow away from the polymeric material suitably in a predetermined flow path. For example, the charged solvent may be pumped away from the polymeric material.

Preferably, in the method, the solvent formulation is arranged to flow from a first region to a third region via a second region in which said polymeric material is arranged. The flow rate of said solvent formulation through said second region in which said polymeric material is arranged may be at least 0.05 ml/min, suitably at least 0.075 ml/min, preferably at least 0.1 ml/min more preferably at least 0.125 ml/min per gram of polymeric material present in said second region. The flow rate may be less than 10 ml/min, preferably less than 7 ml/min, more preferably less than 5 ml/min, especially 3 ml/min or less pre gram of polymeric material present in said second region.

Whilst it is preferred for the temperature and pressure of the solvent formulation to be at or near the temperature and pressure used to purify the polymeric material in the method prior to contact with said polymeric material, in some cases, the solvent formulation may be contacted with said polymeric material and the temperature and pressure of the said formulation may then be adjusted.

In the method, said solvent formulation may be caused to flow substantially continuously through said second region during said method.

In the method, agitation means may be operated to agitate (e.g. stir) the polymeric material and/or said solvent formulation.

In the method, solvent formulation may be contacted with said polymeric material over a period of at least 5 minutes, preferably at least 15 minutes, more preferably at least 30 minutes, especially at least 45 minutes. The period of contact may be less than 12 hours.

Preferably, the method involves arranging said polymeric material in a receptacle which has an inlet and an outlet for said solvent formulation. The receptacle is preferably heated and arranged to withstand pressures of greater than 50 bar, preferably greater than 100 bar, more preferably greater than 150 bar.

The method may be used to reduce the level of impurities of inorganic salts in said polymeric material. This is surprising since water is generally regarded as becoming more organic in character at temperatures above 100° C. and at greater than ambient pressures. The difference between the level of a selected inorganic salt in said polymeric material before contact with said solvent formulation compared to the level after purification in said method may be at least 5 ppm salt, preferably at least 10 ppm salt, more preferably at least 25 ppm salt and, especially, at least 50 ppm salt. The level of said selected inorganic salt after said method may be less than 50 ppm, preferably less than 25 ppm. The ratio of the amount of a selected inorganic salt before contact with said solvent formulation to the level after purification in said method may be at least 1.5, preferably at least 2, more preferably at least 3.

The method may be used to reduce the level of alkali metal cationic impurities in said polymeric material. The difference between the total level of alkali metal cationic impurities in said polymeric material before contact with said solvent formulation compared to the level after purification in said method may be at least 5 ppm $M^+$ (where $M^+$ represents alkali metal cations), preferably at least 10 ppm $M^+$, more preferably at least 25 ppm $M^+$ and, especially, at least 50 ppm $M^+$. The total level of $M^+$ in said polymeric material after said method may be less than 25 ppm $M^+$, is suitably less than 20 ppm, is preferably less than 15 ppm, is more preferably less than 10 ppm and is especially less than 5 ppm. In some cases, the level may be 4 ppm or less, 3 ppm or less or even 2 ppm or less. However, there may be at least a trace (e.g. at least 0.1 ppm) of $M^+$ in said polymeric material. The ratio of the amount of alkali metal cationic impurities in said polymeric material before contact with said solvent formulation to the level after purification in said method may be at least 1.5, preferably at least 2, more preferably at least 3.

The method may be especially useful for reducing the level of $Na^+$ impurities in said polymeric material. The difference between the level of $Na^+$ in said polymeric material before contact with said solvent formulation compared to the level after purification in said method may be at least 5 ppm $Na^+$, preferably at least 10 ppm $Na^+$, more preferably at least 25 ppm $Na^+$ and, especially, at least 50 ppm $Na^+$. The level of $Na^+$ in said polymeric material after said method may be less than 25 ppm $Na^+$, is suitably less than 20 ppm, is preferably less than 15 ppm, is more preferably less than 10 ppm and is especially less than 5 ppm. In some cases, the level may be 4 ppm or less, 3 ppm or less or even 2 ppm or less. There may be at least a trace (e.g. at least 0.1 ppm) of $Na^+$ in said polymeric material. The ratio of the amount of $Na^+$ impurities in said polymeric material before contact with said solvent formulation to the level after purification in said method may be at least 1.5, preferably at least 2, more preferably at least 3.

If $K^+$ impurities are present in said polymeric material, then the level of such impurities may be reduced in the method. Where said polymeric material includes $K^+$ impurities, the difference between the level of $K^+$ in said polymeric material before contact with said solvent formulation compared to the level after purification in said method may be at least 5 ppm $K^+$, preferably at least 10 ppm $K^+$, more preferably at least 15 ppm $K^+$, especially at least 25 ppm $K^+$. The level of $K^+$ in said polymeric material after said method may be less than 25 ppm $K^+$, suitably less than 20 ppm, preferably less than 15 ppm, more preferably less than 10 ppm, especially less than 5 ppm, more preferably less than 10 ppm, especially less than 5 ppm. In some cases, the level may be 4 ppm or less, 3 ppm or less or 2 ppm or less. If $K^+$ impurities are present in said polymeric material before treatment a trace (e.g. at least 0.1 ppm) of $K^+$ may be present in said polymeric material after treatment.

The level of $Al^{3+}$ in said polymeric material after treatment is preferably less than 25 ppm $Al^{+3}$, suitably less than 20 ppm, preferably less than 15 ppm, more preferably less than 10 ppm, especially less than 5 ppm. In especially preferred embodiments the level of $Al^{3+}$ is less than 3 ppm, less than 1 ppm and, preferably, the level is 0 ppm.

If $F^-$ impurities are present in said polymeric material, then the level of such impurities may be reduced in the method. It should be noted that, in some embodiments, said polymeric material may include fluorine end groups and that such groups are not to be regarded as impurities in the context described. Where said polymeric material includes $F^-$ impurities, the difference between the level of $F^-$ in said polymeric material before contact with said solvent formulation compared to the level after purification in said method may be at least 5 ppm $F^-$, preferably at least 10 ppm, especially at least 15 ppm. The level of $F^-$ in said polymeric material after said treatment may be less than 25 ppm $F^-$, suitably less than 20 ppm, preferably less than 15 ppm, more preferably less than 10 ppm, especially less than 5 ppm.

Preferably, the molecular weight of the polymeric material is unchanged by purification thereof in the method. Preferably, in the method no covalent bonds within the polymeric material are broken. End atoms or groups of the polymeric material, for example fluorine end groups which may be produced in certain processes for preparing polyketones, may not be affected by the process. Thus, the levels of a selected end group (e.g. a fluorine end group) in the polymeric material before and after purification in the method are substantially identical.

If $Cl^-$ impurities are present in said polymeric material, then the level of such impurities may be reduced in the method. Where said polymeric material includes $Cl^-$ impurities, the difference between the level of $Cl^-$ in said polymeric material before contact with said solvent formulation compared to the level after purification in said method may be at least 5 ppm $Cl^-$, preferably at least 10 ppm, especially at least 15 ppm. The level of $Cl^-$ in said polymeric material after said treatment may be less than 25 ppm $Cl^-$, suitably less than 20 ppm, preferably less than 15 ppm, more preferably less than 10 ppm, especially less than 5 ppm.

If $CO_3^{2-}$ impurities are present in said polymeric material, then the level of such impurities may be reduced in the method. Where said polymeric material includes $CO_3^{2-}$ impurities, the difference between the level of $CO_3^{2-}$ in said polymeric material before contact with said solvent formulation compared to the level after purification in said method may be at least 5 ppm $CO_3^{2-}$, preferably at least 10 ppm, especially at least 15 ppm. The level of $CO_3^{2-}$ in said polymeric material after said treatment may be less than 25 ppm $CO_3^{2-}$, suitably less than 20 ppm, preferably less than 15 ppm, more preferably less than 10 ppm, especially less than 5 ppm.

The method may be used to reduce the level of phosphorus-containing impurities in said polymeric material. The difference between the level of phosphorus-containing impurities in said polymeric material before contact with said solvent formulation compared to the level after purification may be at least 5 ppm phosphorus, preferably at least 25 ppm phosphorus, more preferably at least 50 ppm phosphorus, especially at least 75 ppm phosphorus. The total level of phosphorus in said polymeric material after said method may be less than 80 ppm phosphorus, preferably less than 70 ppm phosphorus. In preferred embodiment, the level may be less than 50, preferably less than 30, more preferably 10 or less. Whilst the level of phosphorus may be relatively low, the polymeric material preferably includes a trace (e.g. at least 0.1 ppm, or at least 1 ppm) of phosphorus. The ratio of the amount of phosphorus before contact with said solvent formulation to the level after purification in said method may be at least 1.5, preferably at least 2, more preferably at least 3.

The method may be used to reduce the level of sulphur containing impurities in said polymeric material. The difference between the level of sulphur-containing impurities in said polymeric material before contact with said solvent formulation compared to the level after purification may be at least 1 ppm. Where the level before purification is initially high, the difference between the levels before and after purification may be at least 2 ppm, preferably at least 3 ppm and, more preferably, at least 4 ppm. The total level of sulphur after said method may be less than 20 ppm, preferably less than 10 ppm, especially less than 7 ppm. Whilst the level of sulphur is preferably low, the polymeric material may include a trace (at least 0.1 ppm or at least 1 ppm) of sulphur. The ratio of the amount of sulphur before contact with said solvent formulation to the level after purification in said method may be at least 1.2, preferably at least 1.5, especially at least 1.75.

The levels of ions and/or atoms described herein may be assessed using ICPAES (Inductive Coupling Plasma Atomic Emission Spectroscopy).

In the method, it is also suprising to note that the level of residual solvent in the polymeric material may be reduced. In this regard, in the polymerisation process for preparation of said polymeric material, a sulphur-based solvent e.g. a sulphone such as diphenylsulphone or a strong acid such as an alkane sulphonic acid may be used. Solvents used may have boiling points or sublimation temperatures of at least 150° C., suitably at least 190° C. The boiling/sublimation temperatures may be less than 500° C., preferably less than 400° C. Residual solvent can often be detected in the polymeric material. However, the method of the present invention may be used to reduce the level of residual solvent. The ratio of the level of a selected residual solvent before purification in the method to the level after purification in the method may be at least 5, preferably at least 10, more preferably at least 25, especially at least 50. In some cases, said ratio may be at least 100.

Said polymeric material is preferably in solid form when contacted with said solvent formulation. Said polymeric material is preferably not in the form of "toffee"—that is, a material which is highly viscous at a temperature of 150° C.

Suitably, less than 10 wt %, preferably less than 5 wt %, more preferably less than 1 wt %, especially less than 0.5 wt % of polycondensation solvent, for example diphenyl sulphone, is associated with said polymeric material immediately prior to contact with said solvent formulation in the method.

The method may also be used to reduce the level of any other residual reactants used in the preparation of the polymeric material. Such residual reactants may be for example monomers or may be other reactants such as end-cappers or chain terminators. The residual reactants are suitably organic compounds. In some embodiment, they may be aromatic compounds and/or ethers such as optionally-alkylated benzene compounds, alkoxy benzenes or diphenylethers.

The method may be carried out on solid polymeric material in any physical form, for example powder, pellets or granules. It may be particularly advantageously applied to a said polymeric material which is microporous. In some embodiments, the method may be used to purify a surface region of said polymeric material so that the bulk of the polymeric material includes a greater level of impurities compared to a surface region thereof.

Said polymeric material may be in the form of a shaped article. For example, said polymeric material may be in the form of a moulded or extruded article, rather than in the form of a raw material (e.g. powder, pellets or granules). Said shaped article may be for use in the electronics industry, for example it may be a wafer carrier; or it may be for use in the medical industry, for example by being a part of a medical device or other component arranged to contact body tissues or fluids of living persons or animals. By subjecting such a shaped article to said method, a shaped article of greater purity may be formed and such an article may be particularly advantageously used in the electronics or medical industries. In some cases, a shaped article may be subjected to the method to purify a surface region thereof as described above. It should be appreciated that removing impurities from the surface region may be extremely advantageous for certain applications.

Advantageously, a single purification step may be used to purify said polymeric material. In this regard, the polymeric material may be arranged in a receptacle and subjected to said temperature greater than 100° C. and said pressure above ambient pressure for a sufficient time to purify the polymeric material a desired amount. Thus, in said single step, the temperature may remain substantially constant (e.g. it may vary by ±/−20° C. or less) and the pressure may remain substantially constant (e.g. it may vary by +/−20 bar or less). However, in some embodiments, two purification steps may be used. In a first step, the temperature and pressure used may remain substantially constant (as described above) and, subsequently, there may be a second step which is similar to the first step except that a different temperature and/or pressure may be used. Suitably the different temperature/pressure is higher than those used in the first step.

According to a second aspect of the invention, there is provided a polymeric material which includes:

(A) phenyl moieties;

(B) carbonyl and/or sulphone moieties; and (C) ether and/or thioether moieties wherein said polymeric material has been purified in a method according to said first aspect.

According to a third aspect of the invention, there is provided a polymeric material which includes:

(A) phenyl moieties;
(B) carbonyl and/or sulphone moieties; and
(C) ether and/or thioether moieties wherein said polymeric material includes less than 25 ppm of alkali metal cations.

Said polymeric material may include at least a trace of alkali metal cations.

According to a fourth aspect of the invention, there is provided a polymeric material which includes:

(A) phenyl moieties;
(B) carbonyl and/or sulphone moieties; and
(C) ether and/or thioether moieties wherein said polymeric material includes less than 25 ppm of $Na^+$ ions.

Said polymeric material may include at least a trace of $Na^+$ ions.

As described above, in some circumstances, a polymeric material of the type described may be treated so as to purify a surface region thereof predominantly. Thus, in a fifth aspect or the invention, there is provided a polymeric material which includes:

(A) phenyl moieties;
(B) carbonyl and/or sulphone moieties; and
(C) ether and/or thioether moieties wherein a surface region of the polymeric material includes a lower concentration of alkali metal cations (e.g. $Na^+$) compared to the concentration of alkali metal cat-ions (e.g. $Na^+$) in a region of said polymeric material inwards of said surface region.

The concentration of alkali metal cations (e.g. $Na^+$) in said surface region may be less than 25 ppm, suitably less than 20 ppm, preferably less than 15 ppm, more preferably less than 10 ppm, especially less than 5 ppm. There may be at least a trace of alkali metal cations (e.g. $Na^+$) in said surface region. The level of alkali metal cations (e.g. $Na^+$) in said region inwards of said surface region may be at least 5 ppm greater than in said surface region.

Said polymeric material of the fifth aspect is preferably a shaped article as described herein.

According to a sixth aspect of the invention, there is provided a method of making a shaped article comprising: forming, for example by moulding, especially injection moulding, a shaped article from a polymeric material which includes:

(A) phenyl moieties;
(B) carbonyl and/or sulphone moieties; and
(C) ether and/or thioether moieties; and contacting said shaped article with a solvent formulation which is at a temperature of greater than 100° C. and at a pressure above ambient pressure thereby to charge the solvent formulation with impurities derived from said shaped article (e.g. from a surface region of said shaped article) and separating the charged solvent from the shaped article.

According to a seventh aspect of the invention, there is provided a shaped article as described in any statement herein.

According to a eighth aspect of the invention, there is provided a device, for example a device for use in the electronics industry or a medical device, the device including a purified polymeric material as described herein.

According to a ninth aspect of the invention there is provided the use of a purified polymeric material as described herein in the electronics or medical industries.

Polymeric materials described herein may be prepared by electrophilic or nucleophilic processes. They are preferably prepared as described in EP 0 001879 and WO00/15691.

Polymers having units I, II, III, IV, IV*, V and/or V* may be prepared by:

(a) polycondensing a compound of general formula

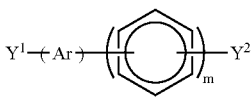

VI with itself wherein $Y^1$ represents a halogen atom or a group -EH and $Y^2$ represents a halogen atom or, if $Y^1$ represents a halogen atom, $Y^2$ represents a group E'H; or (b) polycondensing a compound of general formula

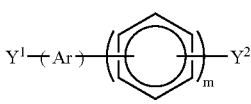

VI with a compound of formula

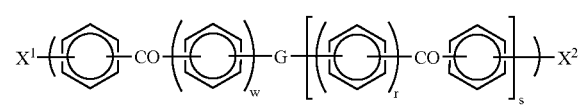

VII and/or with a compound of formula

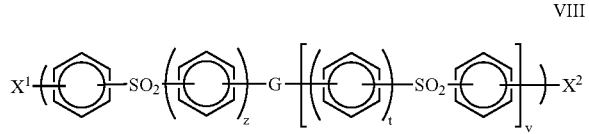

VIII wherein $Y^1$ represents a halogen atom or a group -EH (or -E'H if appropriate) and $X^1$ represents the other one of a halogen atom or group -EH (or -E'H if appropriate) and $Y^2$ represents a halogen atom or a group -E'H and $X^2$ represents the other one of a halogen atom or a group -E'H (or -EH if appropriate).

(c) optionally copolymerizing a product of a process as described in paragraph (a) with a product of a process as described in paragraph (b);

wherein the phenyl moieties of units VI, VII and/or VIII are optionally substituted; and Ar, m, w, r, s, z, t, v, G, E and E' are as described above except that E and E' do not represent a direct link;

the process also optionally comprising cross-linking a product of the reaction described in paragraphs (a), (b) and/or (c) to prepare said polymer.

Preferably, where $Y^1$, $Y^2$, $X^1$ and/or $X^2$ represent a halogen, especially a fluorine, atom, an activating group, especially a carbonyl or sulphone group, is arranged ortho- or para- to the halogen atom.

Preferred halogen atoms are fluorine and chlorine atoms, with fluorine atoms being especially preferred. Preferably, halogen atoms are arranged meta- or para- to activating groups, especially carbonyl groups.

Wherein the process described in paragraph (a) is carried out, preferably one of $Y^1$ and $Y^2$ represents a fluorine atom and the other represents an hydroxy group. More preferably in this case, $Y^1$ represents a fluorine atom and $Y^2$ represents an hydroxy group. Advantageously, the process described in paragraph (a) may be used when Ar represents a moiety of structure (i) and m represents 1.

When a process described in paragraph (b) is carried out, preferably, $Y^1$ and $Y^2$ each represent an hydroxy group. Preferably, $X^1$ and $X^2$ each represent a halogen atom, suitably the same halogen atom.

Compounds of general formula VI, VII and VIII are commercially available (eg from Aldrich U.K) and/or may be prepared by standard techniques, generally involving Friedel-Crafts reactions, followed by appropriate derivatisation of functional groups. The preparations of some of the monomers described herein are described in P M Hergenrother, B J Jensen and S J Havens, Polymer 29, 358 (1988), H R Kricheldorf and U Delius, Macromolecules 22, 517 (1989) and P A Staniland, Bull, Soc, Chem, Belg., 98 (9–10), 667 (1989).

After preparation of said polymer, it is preferably isolated and solvent(s) used in the polycondensation removed so that the level of such solvents is less than 5 wt %, preferably less than 1 wt % of the level thereof during the polycondensation.

Preferred polymeric materials for use in the method are preferably prepared in a polycondensation reaction involving at least one bisphenol (e.g. hydroquinone), at least one aromatic dihalide (e.g. 4,4'-difluorobenzophenone) in the presence of an alkali metal carbonate or bicarbonate and in the presence of a solvent, suitably as described in EP 0001879. The polymeric material prepared is preferably washed prior to use in the method.

Any feature of any aspect of any invention or embodiment described herein may be combined with any feature of any aspect of any other invention or embodiment described herein mutatis mutandis.

BRIEF DESCRIPTION OF THE DRAWING

Specific embodiments of the invention will now be described, by way of example, with reference to FIG. 1 which is a schematic representation of a purification apparatus.

DETAILED DESCRIPTION OF PREFERRED EMBODIMENTS

Figure 1:
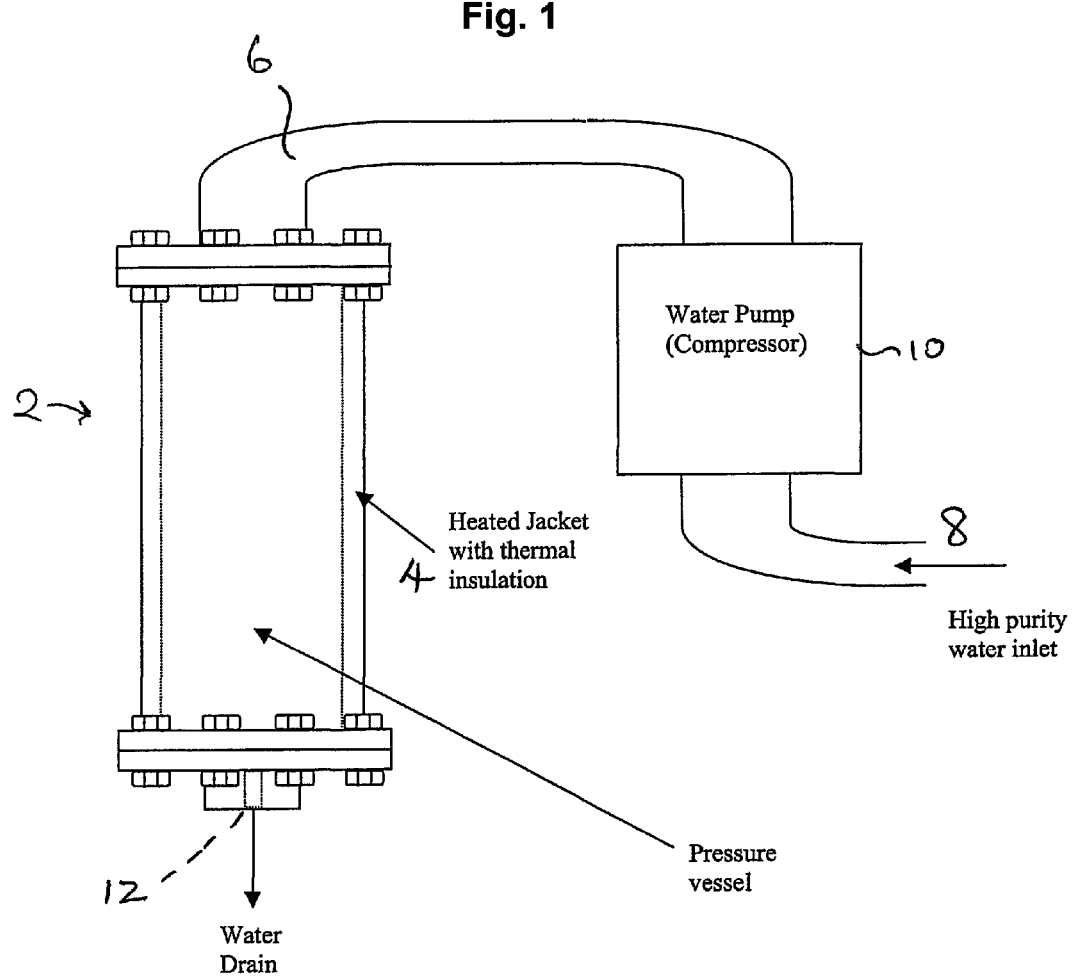

The purification apparatus shown in FIG. 1 includes a pressure vessel 2 which has a heated and thermally insulated jacket 4. Upstream of the vessel is a water supply line 6 for delivering pressurised water into the vessel 2. Water enters the supply line 6 at inlet 8 and is pumped to the vessel 2 by a water pump/compressor 10. Downstream of the vessel 2 there is a water drain 12 for removing water to waste.

In use, a sample of polyketone is placed in the vessel 2 and then liquid water at high pressure and temperature is caused to flow through the vessel whereby relatively pure polyketone can be prepared.

Unless otherwise stated in the following examples, the levels of components in ppm were determined using Inductively Coupled Plasma Atomic Emission Spectroscopy (IC-PAES). The technique is a multi-element analysis technique that uses an inductively coupled plasma source to dissociate the sample into its constituent atoms and ions, exciting them to a level where they emit light of a characteristic wavelength. A detector measures the intensity of the emitted light, and calculates the concentration of that particular element in the sample. At the temperatures involved (10000° C.) even the most refractory elements are atomised with high efficiency. ICP-AES therefore has a detection limit which is typically 1–10 ppb. Thus, the technique measures the level of elements irrespective of the form (e.g. as ions or covalently bonded to other atoms). In the method, a sample to be assessed is split into two portions and placed in platinum crucibles. These platinum crucibles are placed in a muffle furnace at 575° C., along with two further empty platinum crucibles as blanks. The samples are ashed overnight and the residues dissolved in 70% nitric acid (doubly distilled, Aldrich Chemical Company, UK). The samples are then analysed in duplicate in a Perkin Elmer Optima 4300DV ICP-AES machine and the results adjusted to account for the blank samples.

In a series of specific examples, 2–8 g samples of polyetheretherketone powder (PEEK™ 450 P obtained from Victrex Plc of Thornton Cleveleys, UK; melting point 343° C.) having about 125 ppm of $Na^+$ were placed in vessel 2 and were contacted with liquid water at 320° C. and 200 bar. The water was arranged to flow through the vessel at a flow rate of 1–3 ml/minute and the total extraction time (ie. the time for which the powder is contacted with water) was 60 minutes. The polymer was dried at 140° C. under vacuum. It was found that the sodium content of the polyetheretherketone was reduced to 3 ppm or lower.

EXAMPLE 2

A sample of milled extruded rods of polyetheretherketone polymer (7.5 g) (melting point 343° C.) having approximately 220,000 ppm of $Na^+$ was placed in vessel 2 and was contacted with liquid water at 320° C. and 200 bar. The water was arranged to flow through the vessel at a flow rate of 1–3 ml/minute and the total extraction time (ie. the time for which the powder is contacted with water) was 120 minutes. The polymer was dried at 140° C. under vacuum. It was found that the sodium content of the polyetheretherketone was reduced to 12 ppm. The end groups of the extracted polymer were analysed by 13C Nuclear Magnetic Resonance Spectroscopy which showed that the level of fluorine ended chains had not changed as a result of the extraction.

EXAMPLES 3–6

The procedure of Example 2 was repeated for Examples 3–6. The variations in conditions and the resultant analysis of the product are summarised in Table 1 below in addition to the level of elements present in the polyetheretherketone prior to extraction. The reference N/D in the table means "not determined".

TABLE 1

| Example | Untreated polyetheretherketone | 3 | 4 | 5 | 6 |
|---|---|---|---|---|---|
| Sample Weight (g) | — | 7.5 | 7.5 | 7.5 | 7.5 |
| Temperature (° C.) | — | 300 | 200 | 200 | 275 |
| Pressure (bar) | — | 200 | 200 | 200 | 60 |
| Flow Rate (ml/min) | — | 2.5 | 1.5 | 1.5 | 1.5 |

TABLE 1-continued

| Example | Untreated polyetheretherketone | 3 | 4 | 5 | 6 |
|---|---|---|---|---|---|
| Extraction Time (min) | — | 127 | 199 | 720 | 840 |
| Residual Na (ppm) | 110 | 2 | 17 | 4.3 | 0.2 |
| Residual Al (ppm) | 2.7 | N/D | N/D | 0.3 | 0.3 |
| Residual Ca (ppm) | 20 | N/D | N/D | 10.65 | 5.8 |
| Residual Fe (ppm) | 1.8 | N/D | N/D | 1.65 | 0.8 |
| Residual P (ppm) | 85 | N/D | N/D | 7.9 | 1.4 |
| Residual S (ppm) | 4.3 | N/D | N/D | 3.15 | 2.0 |
| Residual Sr (ppm) | 0.38 | N/D | N/D | 0.20 | 0.06 |

EXAMPLE 7

A sample of powdered polyetheretherketone polymer (800 g) (melting point 343° C.) having approximately 110 ppm of $Na^+$ was placed in vessel 2 and was contacted with liquid water at 275° C. and 60 bar. The water was arranged to flow through the vessel at a flow rate of 6.25 l/hr and the total extraction time (ie. the time for which the powder is contacted with water) was 4 hours. The polymer was dried at 140° C. under vacuum. It was found that the sodium content of the polyetheretherketone was reduced to 0.7 ppm. This was accompanied by a reduction in the level of Al from 2.7 ppm to <0.05 ppm, Ca from 20 ppm to 1.45 ppm, Fe from 1.8 ppm to 0.72 ppm, P from 85 ppm to 1.45 ppm, S from 4.3 ppm to 2.5 ppm and Sr from 0.38 ppm to 0.11 ppm.

EXAMPLES 8 AND 9

The procedure of Example 7 was repeated for Examples 8 and 9. The variations in conditions and the resultant analysis of the products are summarised in Table 2 below. The levels of elements present in the polyetheretherketone prior to treatment are stated in the table.

TABLE 2

| Example | Untreated Polyetheretherketone | 8 | 9 |
|---|---|---|---|
| Sample Weight (g) | — | 800 g | 800 g |
| Temperature (° C.) | — | 275 | 275 |
| Pressure (bar) | — | 60 | 60 |
| Flow Rate (l/hr) | — | 5.75 | 1.87 |
| Extraction Time (hr) | — | 4 | 4 |
| Residual Na (ppm) | 110 | 0.25 | 2.0 |
| Residual Al (ppm) | 2.7 | <0.05 | <0.2 |
| Residual Ca (ppm) | 20 | 1.55 | 3.20 |
| Residual Fe (ppm) | 1.8 | 1.02 | 0.37 |
| Residual P (ppm) | 85 | <0.2 | <4.75 |
| Residual S (ppm) | 4.3 | 2.2 | 3.0 |
| Residual Sr (ppm) | 0.38 | 0.08 | 0.22 |

EXAMPLE 10

A sample of purified polyetherethereketone polymer (7.5 g) (melting point 343° C.) having approximately 12 ppm of $Na^+$ was placed in vessel 2 and was contacted with liquid water (45 ml) at 275° C. and 60 bar. The polymer was allowed to soak in the water for 4 hours and then cooled and washed once by immersion in ultra pure water (obtained using on Elga Purelab E5/E10 water purification system which employs both ion-exchange and reverse osmosis to produce water with 15–16 $M\Omega cm^{-1}$ resitivity) followed by draining with ultrapure water (45 ml). The polymer was dried at 140° C. under vacuum. The difference in the level of residual ionics before and after extraction is shown in Table 3.

TABLE 3

| Example | Polyetheretherketone prior to treatment | 10 |
|---|---|---|
| Sample Weight (g) | — | 7.5 g |
| Temperature (° C.) | — | 275 |
| Pressure (bar) | — | 60 |
| Flow Rate (l/hr) | — | N/A |
| Extraction Time (hr) | — | 4 |
| Residual Na (ppm) | 12 | 1.02 |
| Residual Al (ppm) | <0.1 | <0.08 |
| Residual Ca (ppm) | 2.9 | <0.004 |
| Residual Fe (ppm) | 0.15 | 0.03 |
| Residual P (ppm) | <10 | 0.2 |
| Residual S (ppm) | 12.5 | 6.7 |
| Residual Sr (ppm) | 0.27 | <0.09 |

EXAMPLE 11

A sample of commercially available Gharda (GATONE) 5300 G polyetheretherketone was obtained and was found to contain 190 ppm of sodium. A 5 g portion of milled granules of the sample was washed with 6 liters of hot demineralised water by placing it in a glass teaching column with a glass sinter and passing 6 liters of demineralised water at 70–80° C. though it. The sample was dried in an air oven overnight and when analysed was found to contain 165 ppm of sodium.

A further 5 g of the milled granules were extracted using apparatus similar to that show in FIG. 1, using superheated water at 275° C. and 60 bar for 4 hours at a flow rate of 5.75 l/h. The sample was then analysed by ICP-AES and compared with the results from the original sample. The details of the analysis are shown in Table 4

TABLE 4

| Example | Untreated Polyetheretherketone Granules | Superheated Water Extracted polyetheretherketone Granules |
|---|---|---|
| Sample Weight (g) | — | 5.0 g |
| Temperature (° C.) | — | 275 |
| Pressure (bar) | — | 60 |
| Flow Rate (l/hr) | — | 5.75 |
| Extraction Time (hr) | — | 4 |
| Residual Na (ppm) | 190 | 87 |
| Residual Al (ppm) | 5.75 | 5.0 |
| Residual Ca (ppm) | 17 | 12 |
| Residual Mg (ppm) | 5.2 | 3.3 |
| Residual Fe (ppm) | 8.6 | 5.5 |
| Residual P (ppm) | 165 | 62 |
| Residual S (ppm) | 12.5 | <2 |

From these results it would appear that whilst superheated water extraction of milled granules is not as effective as a similar extraction on a microporous powder, it does provide a significant reduction in the level of ionic impurities, both from the surface and from the bulk. In the example, sodium and phosphorous levels were reduced by >50%. Thus, the process allows the removal of ionics from polymers to obtain levels of residual ionics which would not be possible by traditional washing techniques.

EXAMPLE 12

Diphenyl sulphone (DPS) is a solvent used in the preparation of polyketones according to the method described in EP0001879 (Imperial Chemical Industries). The level of extractable DPS in polyetheretherketone powder prepared as described in EP0001879 was determined by extracting the powder with acetone at ambient temperature and assessing the level by Gas Chromatography. 0.053% wt DPS was detected in the polymer. The purified polyetheretherketone polymer of Example 6 was assessed in a similar manner but it was not possible to detect any DPS in the polymer. The purified polyetheretherketone polymer was also analysed by thermal desorption gas chromatography gas spectrometry (TDGCMS) at 360° C. and DPS was detected. However, it was noted that the level of residual DPS was at least two orders of magnitude lower than in the polyetheretherketone polymer before purification.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

The invention claimed is:

1. A method of purifying a polymeric material which includes:
   (A) phenyl moieties;
   (B) ketone and/or sulphone moieties; and
   (C) ether and/or thioether moieties;
   wherein said polymeric material has a moiety of formula:

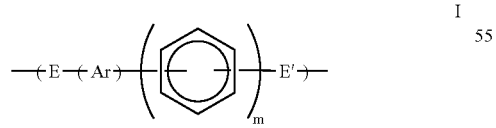

I and/or a moiety of formula

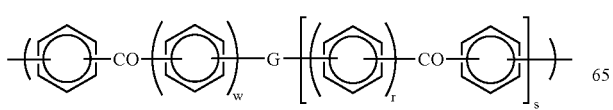

II and/or a moiety of formula

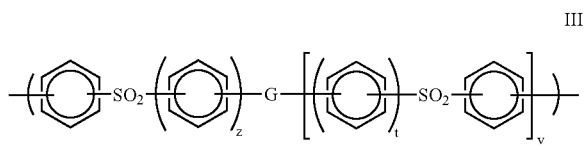

III wherein "a" represents the mole % of units of formula I in said polymeric material, "b" represents the mole % of units of formula II in said polymeric material and "c" represents the mole % of units of formula III in said polymeric material, wherein the sum of a, b and c is at least 90;

wherein the phenyl moieties in units I, II, and III are independently optionally substituted and optionally cross-linked; and wherein m, r, s, t, v, w and z independently represent zero or a positive integer, E and E' independently represent an oxygen or a sulphur atom or a direct link, G represents an oxygen or sulphur atom, a direct link or a —O—Ph—O— moiety where Ph represents a phenyl group and Ar is selected from one of the following moieties (i)*, (i)**, (i) to (x) which is bonded via one or more of its phenyl moieties to adjacent moieties

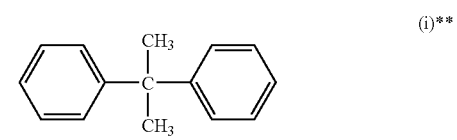
(i)**

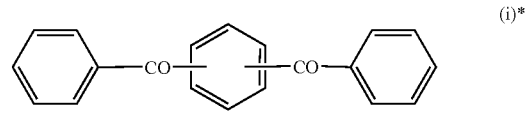
(i)*

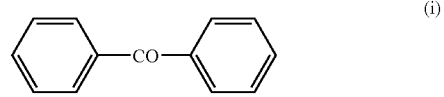
(i)

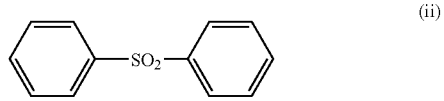
(ii)

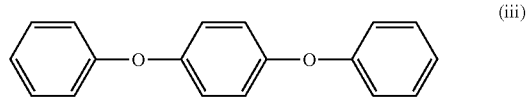
(iii)

(iv)

(v)

-continued

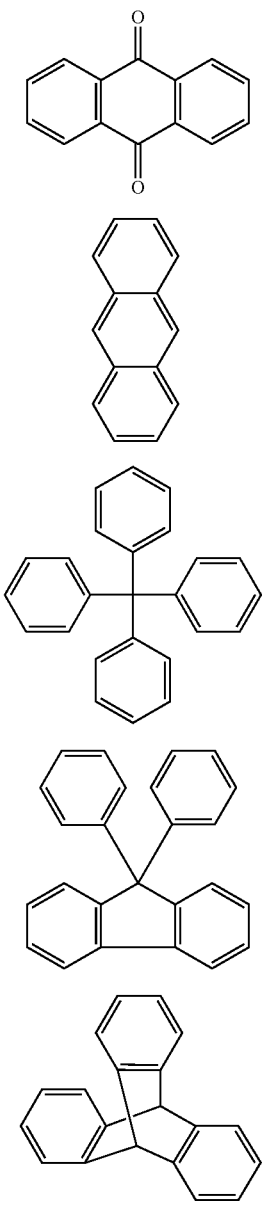

the method including contacting the polymeric material which is in solid form and which includes less than 1 wt % of polycondensation solvent with a solvent formulation which is at a temperature of greater than 100° C. and a pressure above ambient pressure thereby to charge the solvent formulation with impurities derived from said polymeric material, and separating the charged solvent from the polymeric material.

2. A method according to claim 1, wherein said solvent formulation includes a first solvent component which is not an organic solvent and has a boiling point of at least 95° C. and less than 200° C.

3. A method according to claim 2, wherein said first solvent component is water.

4. A method according to claim 1, wherein said solvent formulation consists essentially of water.

5. A method according to claim 3, wherein said solvent formulation is at a temperature of greater than 150° C. and a pressure of at least 10 bar when contacted with said polymeric material.

6. A method according to claim 1, wherein said solvent formulation is at a temperature of greater than 250° C. and a pressure of at least 50 bar when contacted with said polymeric material.

7. A method according to claim 1, wherein in the method, the solvent formulation is arranged to flow from a first region to a third region via a second region in which said polymeric material is arranged wherein the flow rate of said solvent formulation through said second region is at least 0.05 ml/min per gram of polymeric material present in said second region and said solvent formulation is contacted with said polymeric material over a period of at least 5 minutes.

8. A method according to claim 1, wherein the difference between the level of a selected inorganic salt in said polymeric material before contact with said solvent formulation compared to the level after purification in said method is at least 5 ppm salt and the ratio of the amount of said selected inorganic salt in said polymeric material before contact with said solvent formulation to the level after purification in said method is at least 1.5.

9. A method according to claim 1, wherein the difference between the total level of alkali metal cationic impurities in said polymeric material before contact with said solvent formulation compared to the level after purification in said method is at least 5 ppm $M^+$ wherein $M^+$ represents alkali metal cations and the ratio of the amount of alkali metal cationic impurities in said polymeric material before contact with said solvent formulation to the level after purification in said method is at least 1.5.

10. A method according to claim 1, wherein the difference between the level of $Na^+$ in said polymeric material before contact with said solvent formulation compared to the level after purification in said method is at least 5 ppm $Na^+$ and the ratio of the amount of $Na^+$ impurities in said polymeric material before contact with said solvent formulation to the level after purification in said method is at least 1.5.

11. A method according to claim 1, wherein the molecular weight of the polymeric material is unchanged by purification thereof in the method.

12. A method according to claim 1, wherein the ratio of the level of a selected residual solvent which is a solvent used in the polymerisation to form said polymeric material, before purification in the method to the level after purification in the method is at least 5.

13. A method according to claim 1, wherein the difference between the level of phosphorus containing impurities in said polymeric material before contact with said solvent formulation compared to the level after purification is at least 5 ppm phosphorus and the ratio of the amount of phosphorus before contact with said solvent formulation to the level after purification in said method is at least 1.5.

14. A method according to claim 1, wherein the difference between the level of sulphur containing impurities in said polymeric material before contact with said solvent formulation compared to the level after purification is at least 1 ppm and the ratio of the amount of sulphur before contact with said solvent formulation to the level after purification in said method is at least 1.2.

15. A method according to claim 1, which is carried out on powder, pellets or granules of said polymeric material.

16. A method according to claim 1, wherein said polymeric material is selected from polyetheretherketone, polyetherketone, polyetherketoneketone, polyetherketoneether-ketoneketone and polyetheretherketoneketone.

17. A method according to claim 1, wherein said polymeric material is polyetheretherketone.

18. A polymeric material which includes:
(A) phenyl moieties;
(B) ketone and/or sulphone moieties; and
(C) ether and/or thioether moieties;
wherein said polymeric material has a moiety of formula:

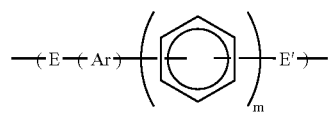

I and/or a moiety of formula

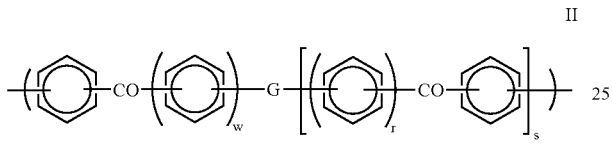

II and/or a moiety of formula

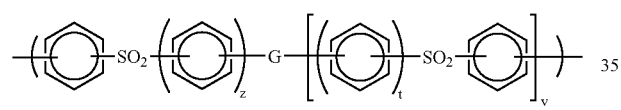

III wherein "a" represents the mole % of units of formula I in said polymeric material, "b" represents the mole % of units of formula II in said polymeric material and "c" represents the mole % of units of formula III in said polymeric material, wherein the sum of a, b and c is at least 90;

wherein the phenyl moieties in units I, II, and III are independently optionally substituted and optionally cross-linked; and wherein m, r, s, t, v, w and z independently represent zero or a positive integer, E and E' independently represent an oxygen or a sulphur atom or a direct link, G represents an oxygen or sulphur atom, a direct link or a —O—Ph—O— moiety where Ph represents a phenyl group and Ar is selected from one of the following moieties (i)*, (i) (i) to (x) which is bonded via one or more of its phenyl moieties to adjacent moieties (i)

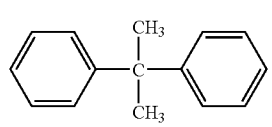

(i)*

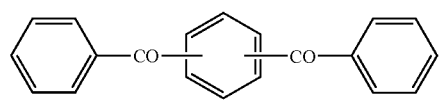

-continued (i)

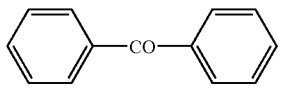

(ii)

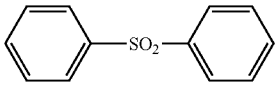

(iii)

(iv)

(v)

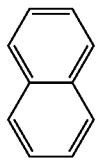

(vi)

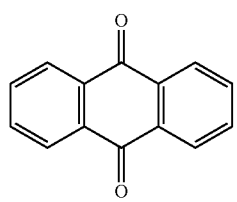

(vii)

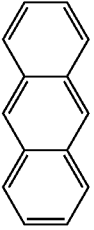

(viii)

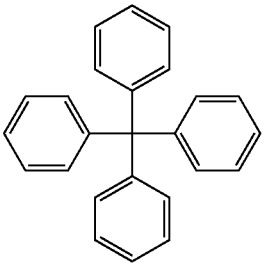

(ix)

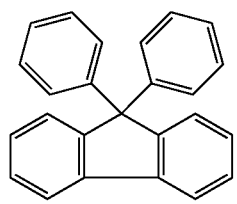

-continued

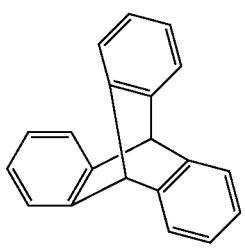
(x)

wherein said polymeric material has been purified in a method according to claim 1.

19. A polymeric material which includes:
(A) phenyl moieties;
(B) ketone and/or sulphone moieties; and
(C) ether and/or thioether moieties;
wherein said polymeric material has a moiety of formula:

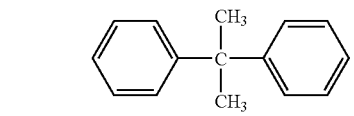
I and/or a moiety of formula

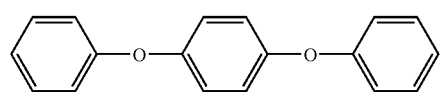
II and/or a moiety of formula

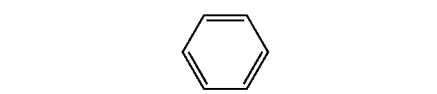
III wherein "a" represents the mole % of units of formula I in said polymeric material, "b" represents the mole % of units of formula II in said polymeric material and "c" represents the mole % of units of formula III in said polymeric material, wherein the sum of a, b and c is at least 90;
wherein the phenyl moieties in units I, II, and III are independently optionally substituted and optionally cross-linked; and wherein m, r, s, t, v, w and z independently represent zero or a positive integer, E and E' independently represent an oxygen or a sulphur atom or a direct link, G represents an oxygen or sulphur atom, a direct link or a —O—Ph—O— moiety where Ph represents a phenyl group and Ar is selected from one of the following moieties (i)*, (i)**, (i) to (x) which is bonded via one or more of its phenyl moieties to adjacent moieties

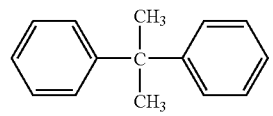
(i)**

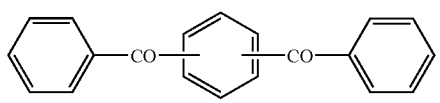
(i)*

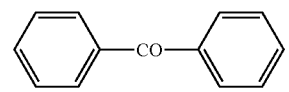
(i)

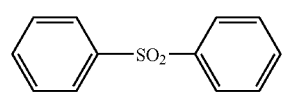
(ii)

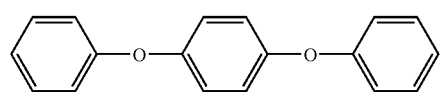
(iii)

(iv)

(v)

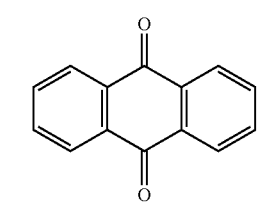
(vi)

(vii)

(viii)

-continued

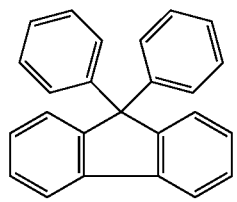
(ix)

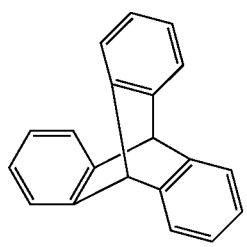
(x)

wherein said polymeric material includes less than 20 ppm of Na$^+$ ions and less than 25 ppm Al$^{3+}$.

20. A polymeric material according to claim 19, wherein said polymeric material includes less than 15 ppm Na$^+$ ions.

21. A polymeric material according to claim 19, wherein said polymeric material includes a trace of Na$^+$ ions.

22. A polymeric material according to claim 19, which includes less than 90 ppm phosphorus.

23. A polymeric material according to claim 19, which includes at least a trace of phosphorus.

24. A polymeric material according to claim 19, which includes less than 20 ppm of sulphur.

25. A polymeric material according to claim 19, which includes at least a trace of sulphur.

26. A polymeric material according to claim 19, which comprises polyetheretherketone and less than 20 ppm of sodium and less than 10 ppm of phosphorus.

27. A polymeric material according to claim 19 which includes less than 5 ppm sodium and less than 10 ppm phosphorus.

28. A polymeric material which includes:
(A) phenyl moieties;
(B) ketone and/or sulphone moieties; and
(C) ether and/or thioether moieties;
wherein said polymeric material has a moiety of formula:

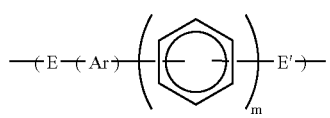
I and/or a moiety of formula

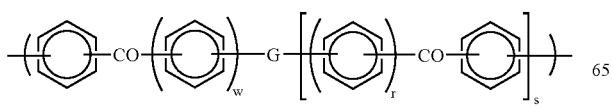
II and/or a moiety of formula

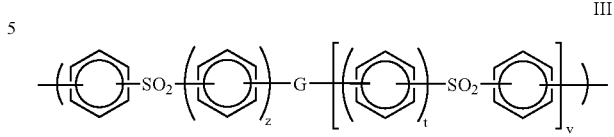
III wherein "a" represents the mole % of units of formula I in said polymeric material, "b" represents the mole % of units of formula II in said polymeric material and "c" represents the mole % of units of formula III in said polymeric material, wherein the sum of a, b and c is at least 90;

wherein the phenyl moieties in units I, II, and III are independently optionally substituted and optionally cross-linked; and wherein m, r, s, t, v, w and z independently represent zero or a positive integer, E and E' independently represent an oxygen or a sulphur atom or a direct link, G represents an oxygen or sulphur atom, a direct link or a —O—Ph—O— moiety where Ph represents a phenyl group and Ar is selected from one of the following moieties (i)*, (i)**, (i) to (x) which is bonded via one or more of its phenyl moieties to adjacent moieties

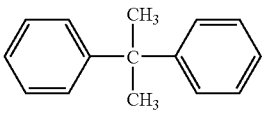
(i)**

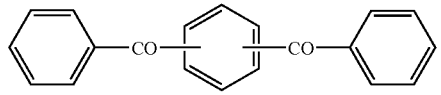
(i)*

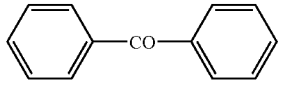
(i)

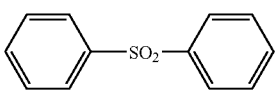
(ii)

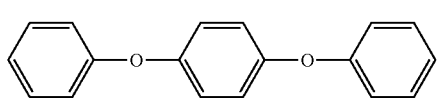
(iii)

(iv)

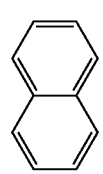
(v)

-continued

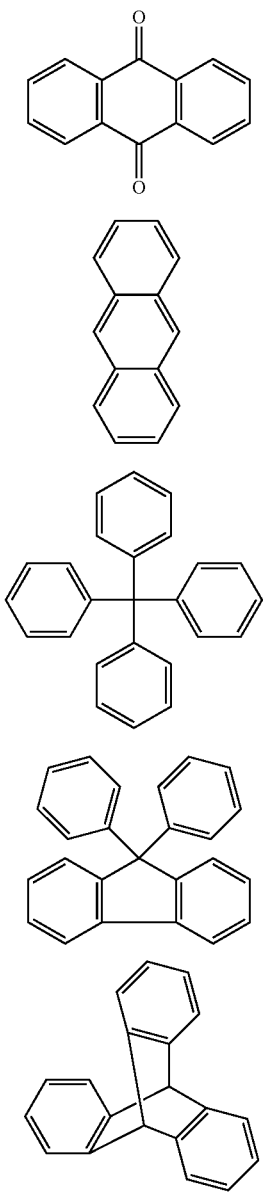

wherein a surface region of the polymeric material includes a lower concentration of alkali metal cations compared to the concentration of alkali metal cations in a region of said polymeric material inwards of said surface region.

29. A device for use in the electronics industry or a medical device, the device including a purified polymeric material according to claim 19.

30. A method of purifying a polymeric material selected from polyetheretherketone, polyetherketone, polyetherketoneketone, polyetherketoneetherketoneketone and polyetheretherketoneketone, the method including contacting solid polymeric material with water which is at a temperature of at least 150° C. and less than 350° C. and pressure above ambient pressure which is selected to maintain the water in the liquid state when in contact with said polymeric material thereby to charge the water with impurities derived from said polymeric material, and separating the water from the polymeric material.

31. A method as claimed in claim 30, wherein said polymeric material is in the form of powder, pellets or granules.

32. A method of reducing the level of an inorganic salt in a polymeric material selected from polyetheretherketone, polyetherketone, polyetherketoneketone, polyetherketoneetherketoneketone and polyetheretherketoneketone, the method including contacting solid polymeric material with water which is at a temperature of at least 150° C. and less than 350° C. and pressure above ambient pressure which is selected to maintain the water in the liquid state when in contact with said polymeric material thereby to charge the water with inorganic salt derived from said polymeric material, and separating the charged water from the polymeric material.

33. A method of reducing the level of phosphorus containing impurities in a polymeric material selected from polyetheretherketone, polyetherketone, polyetherketoneketone, polyetherketoneetherketoneketone and polyetheretherketoneketone, the method including contacting solid polymeric material with water which is at a temperature of at least 150° C. and less than 350° C. and pressure above ambient pressure which is selected to maintain the water in the liquid state when in contact with said polymeric material thereby to charge the water with phosphorus containing impurities derived from said polymeric material, and separating the charged water from the polymeric material.

34. A method of reducing the level of $Na^+$ in a polymeric material selected from polyetheretherketone, polyetherketone, polyetherketoneketone, polyetherketoneetherketoneketone and polyetheretherketoneketone, the method including contacting solid polymeric material with water which is at a temperature of at least 150° C. and less than 350° C. and pressure above ambient pressure which is selected to maintain the water in the liquid state when in contact with said polymeric material thereby to charge the water with $Na^+$ derived from said polymeric material, and separating the charged water from the polymeric material.

35. A method according to claim 30, wherein the difference between the level of $Na^+$ impurities in said polymeric material before contact with said water compared to the level after purification in said method is at least 5 ppm $Na^+$.

36. A method as claimed in claim 30, wherein the difference between the level of phosphorus containing impurities in said polymeric material before contact with said water compared to the level after purification is at least 5ppm phosphorus.

37. A method as claimed in claim 30, wherein the total level of $Na^+$ impurities in said polymeric material after purification in the method is less than 25 ppm $Na^+$; and the total level of phosphorus containing impurities in said polymeric material after purification is less than 80 ppm phosphorus.

38. A method as claimed in claim 37, wherein the ratio of the level of a selected residual solvent associated with the polymeric material before purification in the method to the level after purification is at least 5.

39. A polymeric material selected from polyetheretherketone, polyetherketoneketone, polyetherketone, polyetherketoneetherketoneketone and polyetheretherketoneketone which includes less than 20 ppm $Na^+$ and less than 25 ppm $Al^{3+}$.

40. A polymeric material as claimed in claim 39, wherein said polymeric material is polyetheretherketone.

41. A method according to claim 1, wherein said polymeric material is polyetheretherketone.

42. A method according to claim 1, wherein the method involves arranging said polymeric material in a receptacle which has an inlet and an outlet for said formulation, wherein said receptacle is heated and arranged to withstand pressures of greater than 50 bar.

43. A method according to claim 1, wherein the phenyl moieties in units I, II and III are not optionally substituted and not optionally cross-linked.

44. A polymeric material according to claim 18, wherein the phenyl moieties in units I, II and III are not optionally substituted and not optionally cross-linked.

45. A polymeric material according to claim 19, wherein the phenyl moieties in units I, II and III are not optionally substituted and not optionally cross-linked.

* * * * *